United States Patent [19]

Chiu et al.

[11] Patent Number: 5,250,778
[45] Date of Patent: Oct. 5, 1993

[54] METHOD AND APPARATUS FOR WELDING PAD MATERIAL TO A SPARK PLUG ELECTRODE

[75] Inventors: Randolph K. Chiu, Davison; John F. McKeon, Swartz Creek; Paul A. Wheeler, Linden, all of Mich.

[73] Assignee: General Motors Corporation, Detroit, Mich.

[21] Appl. No.: 782,239

[22] Filed: Oct. 23, 1991

[51] Int. Cl.$^5$ .............................................. B23K 11/00
[52] U.S. Cl. .................................. 219/117.1; 219/56; 445/7
[58] Field of Search ................. 219/56, 56.1, 117.1, 219/56.22; 445/7

[56] References Cited

U.S. PATENT DOCUMENTS

| 3,348,016 | 10/1967 | Fitzgerald et al. | 219/56.1 |
| 4,699,600 | 10/1987 | Kondo | 445/7 |
| 4,810,220 | 3/1989 | Moore | 445/7 |

FOREIGN PATENT DOCUMENTS

| 2234920 | 2/1991 | United Kingdom | 445/7 |

OTHER PUBLICATIONS

"Schlatter C-System", Advertising Brochure of H. A. Schlatter Ltd. of Zurich Switzerland, Sep. 1982.

*Primary Examiner*—Clifford C. Shaw
*Attorney, Agent, or Firm*—Creighton R. Meland

[57] ABSTRACT

Apparatus and method for welding a platinum wire to a ground electrode of a spark plug to form a contact pad of platinum material that is welded to the ground electrode. The ground electrode is attached to and extends from a metallic spark plug shell. The apparatus includes a pivotally mounted nest for receiving and supporting the spark plug shell. A movable welding electrode can be moved into engagement with a lower surface of the ground electrode. The welding electrode has a spherical end surface that engages the ground electrode. The apparatus has opposed gripping fingers that can be moved toward or away from each other. The gripping fingers each have an inclined surface. When the gripping fingers are moved toward each other their inclined surfaces engage the ground electrode to force it into tight engagement with the spherical end surface of the welding electrode. A source of welding current is connected to the wire and to the welding electrode to weld an end portion of the wire to the ground electrode. The wire may have a diameter of about 0.5 mm and the welded pad may be as large as 1.0 mm.

11 Claims, 4 Drawing Sheets 5,250,778

METHOD AND APPARATUS FOR WELDING PAD MATERIAL TO A SPARK PLUG ELECTRODE

This invention relates to a method and apparatus for welding material such as platinum to an electrode of a spark plug to provide a pad of material that is welded to the spark plug electrode that increases the durability of the spark plug electrodes.

BACKGROUND OF THE INVENTION

Spark plugs that have electrodes that are provided with tips or pads formed of a noble metal such as platinum are well known to those skilled in the art, one example being the spark plug disclosed in the Kondo U.S. Pat. No. 4,699,600. In that patent, disks of platinum are resistance welded to the spark plug electrodes. Another method for forming pads of platinum material on a spark plug electrode is to utilize a so-called contact welding method. In that method, a platinum wire is engaged with a surface of a spark plug electrode. A welding current is passed through the platinum wire to cause the portion of the wire that engages the electrode to be welded to the electrode. The wire is then cut-off so that a pad or tip of material remains that is welded to the electrode.

SUMMARY OF THE INVENTION

This invention is concerned with providing a new and improved apparatus and method for forming pads or tips that are welded to a spark plug electrode where the pad or tip is formed of a noble metal such as platinum and where the apparatus welds the end of platinum wire to the electrode. In accordance with one aspect of this invention, the welding apparatus and method is capable of welding platinum wire having a diameter as small as 0.5 mm to a spark plug electrode.

In accordance with another aspect of this invention, and with respect to welding platinum pads to the ground electrode of a spark plug, a lower welding electrode is provided that has a spherical end surface that engages a lower surface of the ground electrode of a spark plug. Further, the welding apparatus has gripping fingers which are arranged to contact and force the ground electrode against the spherical end surface of the lower welding electrode. This arrangement helps to control the surface contact area between the spherical end surface and the ground electrode and hence the welding resistance during welding and thus reduces the variation of welding energy from weld-to-weld.

Another purpose of the spherical end surface, that has been described, is that it allows for twisted or bent ground electrodes to be welded without changing the surface contact area between the welding electrode and the ground electrode. Hence, it controls the variation of contact resistance and welding energy from part-to-part.

In accordance with yet another aspect of this invention, the spark plug shell with its attached ground electrode is supported in a nest that can pivot. This feature coupled with the use of gripping fingers allows platinum wire to be welded to the center (mid-width) of an uncentered, twisted or bent ground electrode.

DETAILED DESCRIPTION OF THE INVENTION

Figure 1:
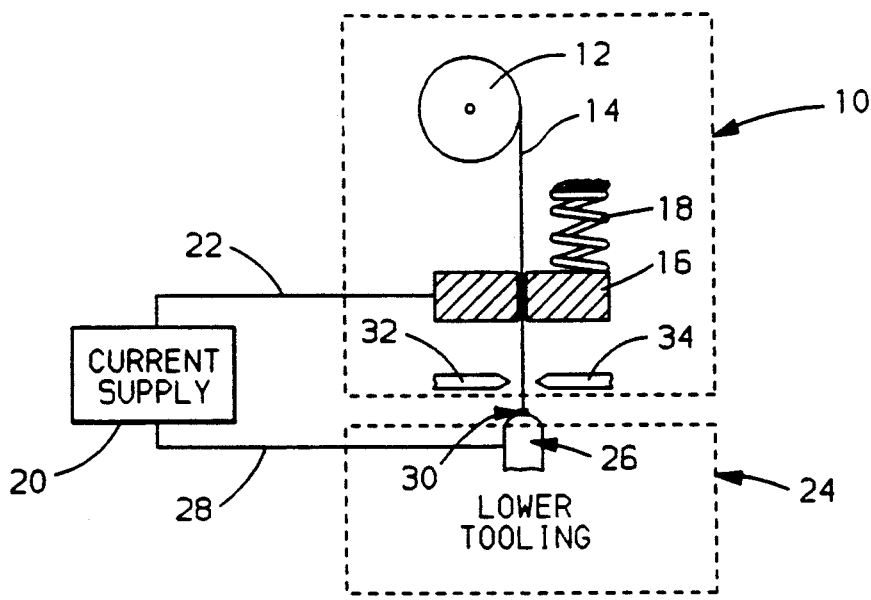
FIG. 1 is illustrates welding apparatus for welding platinum wire to a ground electrode of a spark plug.

Referring to FIG. 1, the reference numeral 10 generally designates a known type of vertical wire feed contact welder. This welder comprises a reel 12 which carries a supply of platinum wire 14. A length of the wire 14 extends vertically downwardly and passes through a collet 16. The collet 16 when closed, grips wire 14. A compression spring 18 urges collet 16 and the gripped wire 14 vertically downward. The collet 16 is electrically connected to one side of an alternating current welding current supply 20 by a conductor 22.

FIG. 1 shows a block 24 labelled "Lower Tooling" which includes tooling that is described in detail hereinafter. This tooling includes a lower welding electrode 26 that is electrically connected to the welding current supply 20 by a conductor 28. The end of electrode 26 engages a lower surface of a ground electrode 30 of a spark plug.

To form a pad of platinum material that is welded to a top surface of ground electrode 30, the collet 16 grips the wire 14 and forces the end of wire 14 into engagement with the top surface of ground electrode 30. The amount of downward force applied to wire 14 against electrode 30 depends upon the amount of force developed by spring 18. Welding current is now passed through a lower portion of wire 14. The current path is from conductor 22 to collet 16, through the portion of the wire 14 between collet 16 and ground electrode 30, through ground electrode 30 to lower welding electrode 26 and then through conductor 28 to the current supply 20. The current flowing in the path described causes the end of wire 14 that engages ground electrode 30 to become molten and hence become welded to ground electrode 30. Once the weld has been made, welding current is turned off. Collet 16 now opens and retracts. The wire 14 is now severed or cut-off at a point closely adjacent the upper surface of ground electrode by cutting blades 32 and 34 that are moved toward each other to cut-off the wire. The cutting blades 32 and 24 have V-shaped ends that cut the wire 14.

Figure 2:
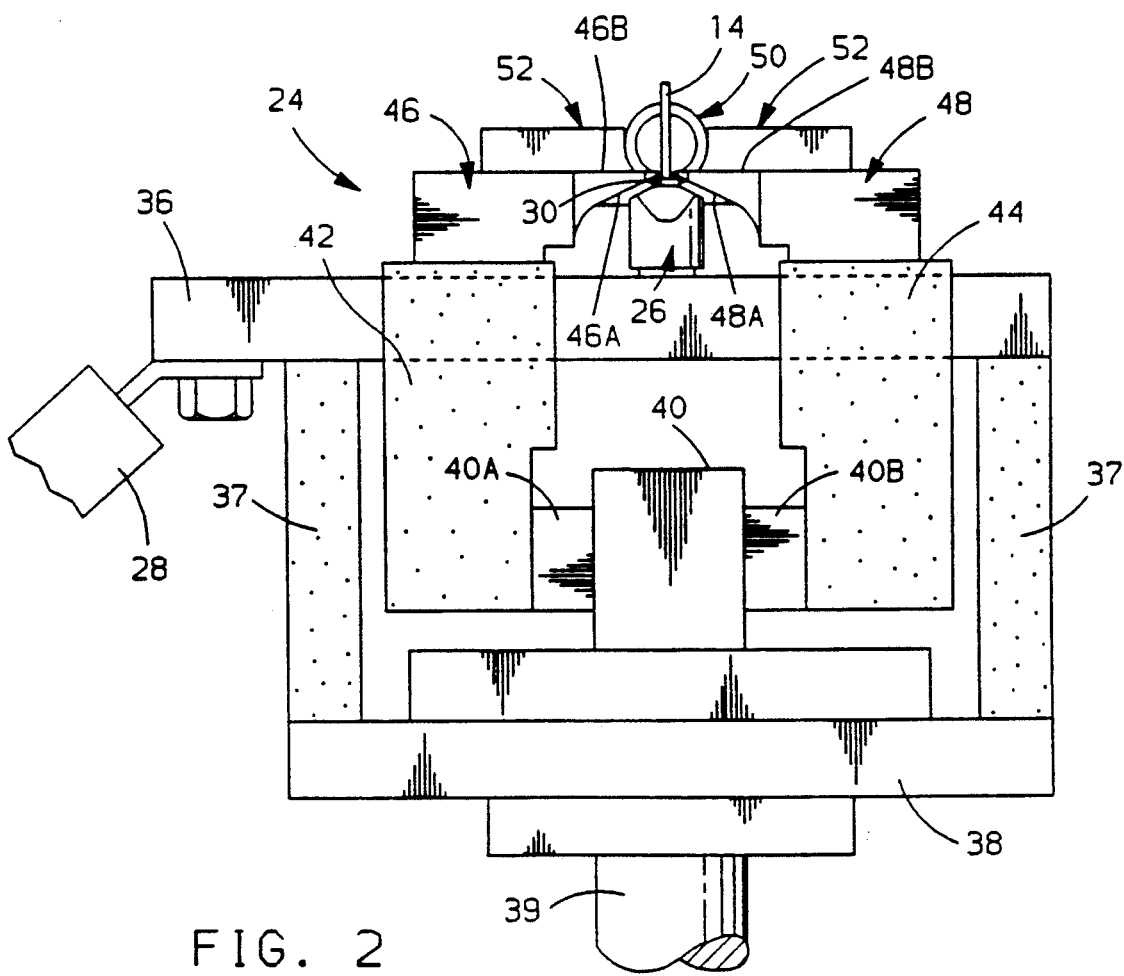
FIG. 2 illustrates lower welding tooling made in accordance with this invention.

The lower tooling 24 will now be described in detail. Referring to FIG. 2, the lower tooling 24 comprises a vertically movable conductor bar 36 that is formed of copper. The conductor bar 36 is connected to and supports the lower welding electrode 26 which also is formed of copper. Conductor bar 36 is connected to conductor 28. -

The conductor bar 36 is secured to and supported by parts 37 that are formed of a plastic electrical insulating material such as nylon. The lower ends of parts 37 are secured to a laterally extending part 38. Part 38 is secured to a shaft 39. The shaft 39 is cam driven by apparatus not illustrated that includes a cam which can cause the assembly shown in FIG. 2 to move vertically upwardly or downwardly.

The assembly shown in FIG. 2 has a pneumatic actuator 40 that is supported by part 38. The actuator 40 has radially shiftable fingers 40A and 40B. When air pressure is supplied to actuator 40, the fingers 40A and 40B are moved radially inwardly toward each other. Actuator 40 may be a so-called gripping head, model No. PH50, sold by the R & I Manufacturing Co. Inc. of Thomaston, Conn. In general, when air pressure is applied to move a piston of the actuator, it moves the parts 40A and 40B radially inwardly by cooperating cam surfaces that translate vertical movement of the piston into radial movement of parts 40A and 40B.

The movable fingers 40A and 40B are secured respectively to gripping finger supports 42 and 44, which are formed of a plastic electrical insulating material such as nylon. Secured to the top end of support 42 is a carbide gripping finger 46 and secured to the top end of support 44 is another carbide gripping finger 48. The pressure applied to the gripping fingers may be about 80 psig.

To summarize what has been described in connection with FIG. 2, the assembly that has been described can be moved vertically upwardly or downwardly by vertical movement of shaft 39. Further, gripping fingers 46 and 48 can be moved radially toward each other (closed position) or radially away from each other (open position). The movement of the gripping fingers is from actuator fingers 40A and 40B to respective finger supports 42 and 44 and then from the finger supports to the gripping fingers.

FIG. 2 shows a metallic spark plug shell 50. This shell 50 carries the ground electrode 30 which extends axially from shell 50. FIG. 2 also shows a length of wire 14 engaging a top surface portion of ground electrode 30 and shows the lower surface of electrode 30 engaging an upper end of lower welding electrode 26.

The spark plug shell 50 is supported by a shell nest 52 which is described in more detail hereinafter. The nest 52 properly positions the ground electrode 30 for welding to wire 14.

Figure 3:
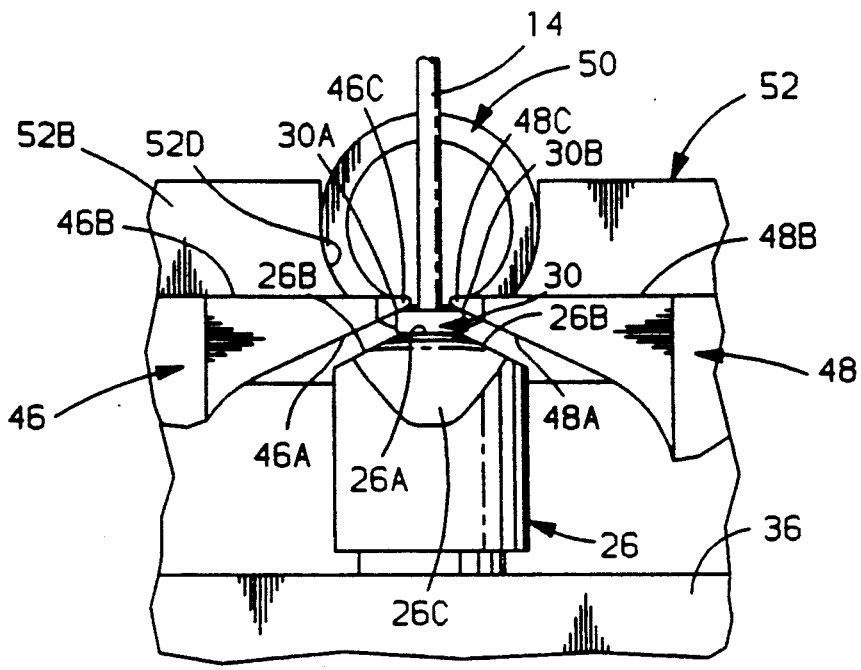
FIGS. 3 and 4 illustrate the shape of the lower welding electrode and gripping fingers utilized in the apparatus of this invention.
Figure 4:
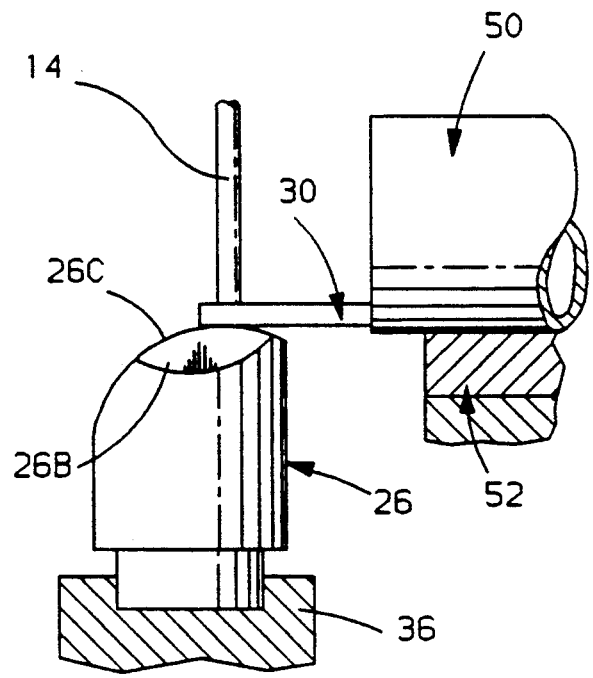
Figure 7:
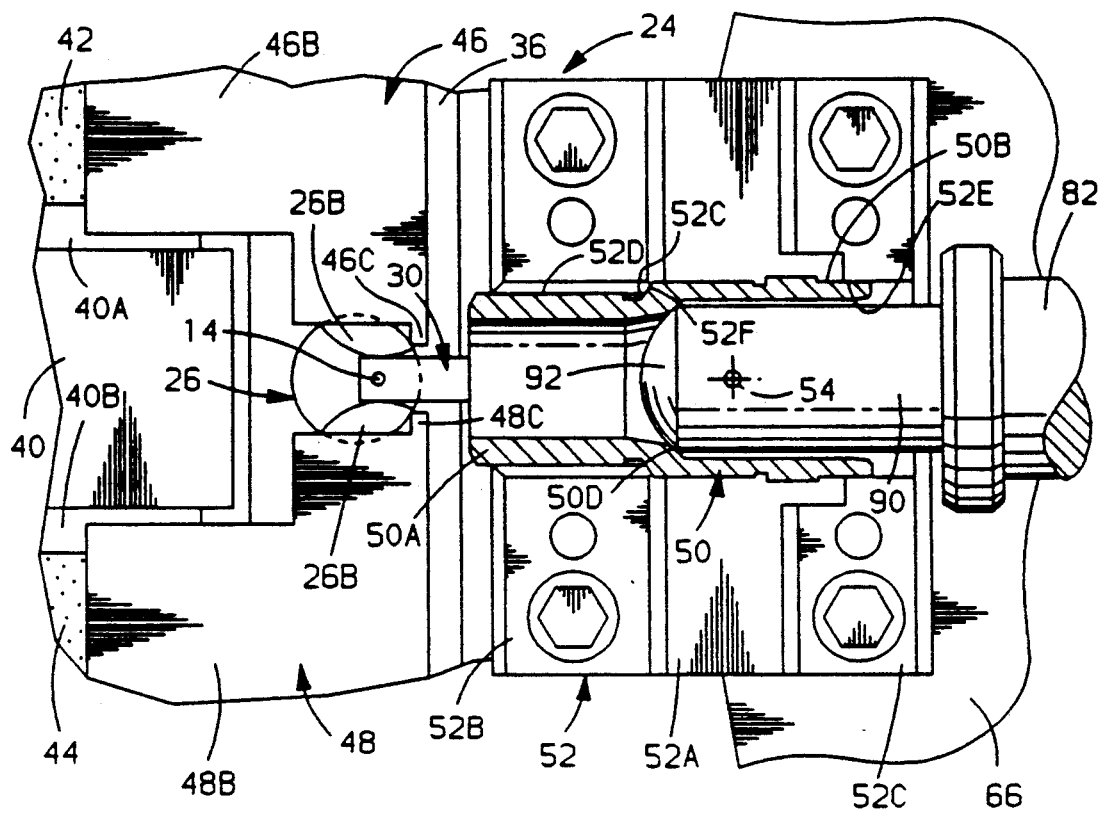
FIG. 7 is a plan view illustrating a pivoting nest and gripping fingers utilized in the apparatus of this invention with the gripping fingers in an open position.
Figure 8:
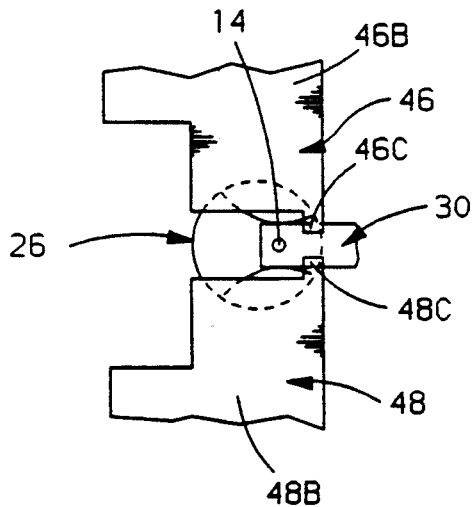
FIG. 8 illustrates a portion of FIG. 7 and shows the gripping fingers in a closed position.

The shape of the gripping fingers 46 and 48 and the shape of welding electrode 26 is shown in more detail in FIGS. 3 and 4. Gripping finger 46 has an inclined surface 46A that is located at an angle of about 30 degrees to top surface 46B. Likewise, gripping finger 48 has an inclined surface 48A that is located at about 30 degrees to the top surface 48B. Further, as shown in FIGS. 7 and 8, a part of the end of gripping finger 46 has been cut-away leaving a tip portion 46C. The underside of portion 46C is a part of the slanted surface 46A. The same is true of gripping finger 48, that is, it has a portion cut-away to form tip portion 48C.

The lower welding electrode 26 as shown in FIGS. 3 and 4 has an end surface which is defined by two spherical radiuses. The first spherical radius surface is designated as 26A and it defines a spherical or curved surface. Surface 26A merges into flat slanted surfaces 26B. The second spherical radius surface or curved surface is designated as 26C. From what has been described, it can be appreciated that the top end of electrode 26 is defined by two curved surfaces that are normal to each other and that the end of electrode 26 has a spherical shape.

Referring now more particularly to FIG. 7, the shell supporting nest 52 is illustrated. As shown in FIGS. 7, the nest 52 is comprised of three parts, 52A, 52B and 52C. Parts 52B and 52C are secured to part 52A and extend upwardly from part 52A. Parts 52B and 52C have been machined to provide semicircular surfaces 52D and 52E that have a shape that corresponds to the outer shape of portions 50A and 50B of the spark plug shell 50. Part 52B has a chamfered surface 52F that engages a chamfered surface 50C on shell 50 in a manner to be described.

The nest 52 can pivot about a point 54 shown in FIG. 7. Thus, and with reference to FIG. 6, the nest 52 is connected to the top end of a pivot pin 56 so that nest 52 and pin 56 rotate together. Pivot pin 56 is journalled for rotation in a bearing 58 which is supported by a part 60 which, in turn, is supported by a part 62. The part 62 is slidably supported by a part 64 which, in turn, is secured to a circular turn-table 66. Only a portion of turn-table 66 has been shown. The turn-table 66 is supported for rotation by means that has not been illustrated and it is rotatably driven during operation of the welding apparatus of this invention.

The welding apparatus of this invention has a circular cam plate 68 that does not rotate or, in other words, is fixed. The cam plate 68 has a cam groove 68A that receives a cam follower part 70. The groove 68A is not entirely circular but rather extends in and out so that as turn-table 66 rotates, the cam follower 70 will be moved to the left and right in FIG. 6, in accordance with the shape of cam groove 68.

The cam follower 70 is secured to a bolt 72 which has an eccentric portion 72A disposed within openings formed in a part 74. Part 74 is attached to a part 76 that slides in a slot 78 formed in a part 80 that is secured to turn-table 66.

The upper left end of part 74 is secured to a shaft 82 by a fastener 84. Shaft 82 extends through a linear bearing 86, that is a type of bearing that allows linear movement of shaft 82 relative to bearing 86. Bearing 86 is secured to a part 88 which, in turn, is secured to part 62 which as previously described, can slide relative to part 64.

Figure 6:
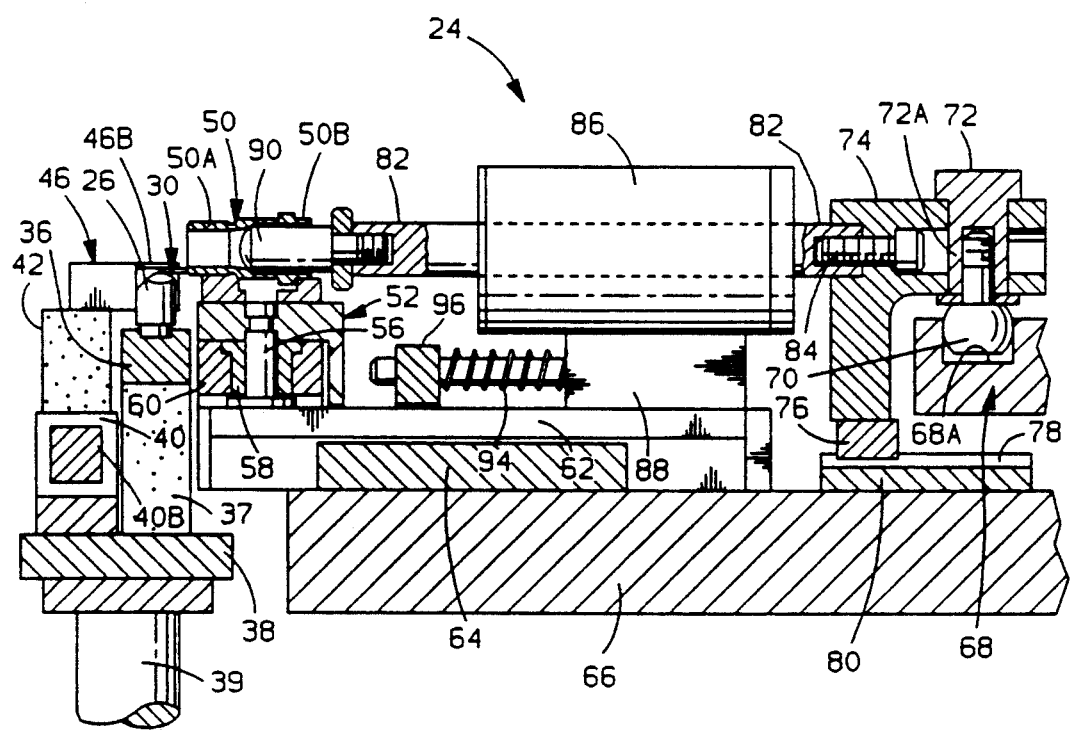

The left end of shaft 82 is connected to a plunger 90 which is shown inserted into spark plug shell 50 in FIGS. 6 and 7. As shown in FIG. 7, the end 92 of plunger 90 is spherical and has a curved outer portion that engages an internal chamfered portion 50D of spark plug shell 50. When plunger 90 is fully inserted into spark plug shell 50, it engages surface 50D and forces surface 50C of shell 50 into tight engagement with surface 52F of nest 52.

The part 88 that is secured to bearing 86, and which slides with slidable part 62, engages one end of a compression spring 94. The opposite end of spring 94 engages a cross-bar 96 which is secured to part 64 or, in other words, is fixed. The spring 94 tends to spring bias parts 88 and 62 to the right in FIG. 6. Since pivot pin 56 and nest 52 move with movement of part 62, the effect of spring 94 is to spring bias surface 52F of nest 52 against surface 50C of spark plug shell 50.

Although only one assembly that includes, among other things, reciprocable shaft 82 is shown supported by turn-table 66, it is to be understood that a plurality of circumferentially spaced like-assemblies are supported by turn-table 66, for example, there can be sixteen such assemblies.

In the operation of the welding apparatus of this invention, rotation of turn-table 66 will cause plunger 90 to be moved to the left and right in FIG. 6. When the plunger moves to the left, it is inserted into a shell 50 and when it moves to the right, the plunger 90 is moved out of the shell. The welding apparatus has stations, not illustrated, disposed about turn-table 66 for loading and unloading spark plug shells 50 to and from nests 52 as well as a straightening station for straightening ground electrode 30 relative to shell 50.

The operation of the welding apparatus of this invention will now be described. Prior to the time that a shell and ground electrode are rotated into the welding position shown in FIG. 7, the gripping fingers 46 and 48 are maintained in an open or retracted position, as shown in FIG. 7. Further, the assembly shown in FIG. 2 is now in a lowered position. When a shell and ground assembly have been moved into the welding position shown in FIG. 7, the assembly shown in FIG. 2 is moved upwardly such that the spherical end surface of welding electrode 26 engages the lower surface of spark plug ground electrode 30 as shown in FIG. 2. Gripping fingers 46 and 48 are now moved from the open retracted position of FIG. 7 to the closed position shown in FIGS. 3 and 8. In the closed position, and with particular reference to FIG. 3, it can be seen that portions of the slanted surfaces 46A and 48A of fingers 46 and 48 engage opposite side edges 30A and 30B of ground electrode 30. The fingers 46 and 48 therefore force the ground electrode 30 downwardly such that the lower surface of ground electrode 30 is forced into tight engagement with the spherical end of welding electrode 26. With the fingers in the position shown in FIG. 3, welding current is applied to wire 14 to form a pad of material that is welded to the upper surface of ground electrode 30.

It has been previously mentioned that the nest 52 can pivot about pivot point 54 (FIG. 7). The purpose of allowing nest 52 to pivot to some extent is to assure that the wire 14 will be midway between the side edges of ground electrode 30 when welding occurs. Thus, as the fingers 46 and 48 move into engagement with ground electrode 30, they will move the ground electrode to a position where wire 14 is centered or located midway between the side edges of ground electrode 30. Any movement of the ground electrode caused by the gripping fingers will cause the shell 50 to move with movement of the ground electrode 30. Shell 50 can pivot relative to the end of plunger 90 by virtue of the engagement of shell surface 50D with the outer portion of curved surface 92 of plunger 90. When shell 50 does pivot, it causes nest 52 to pivot. In regard to what has just been described, if a ground electrode 30 is uncentered, twisted or bent from its normal true position, it will nevertheless be moved by the gripping fingers to a position where wire 14 is midway between the side edges of ground electrode 30 because nest 52 can pivot. This would not be true if the nest 52 were fixed so that it could not pivot.

The amount that the nest 52 can pivot is limited to the space between the outer surface of plunger 90 and the surrounding inner surface of shell 50. The amount that shell 50 can pivot may be about three degrees. However, the width of the ground electrode 30 is only about 2.5 mm so that an allowed three degree pivot movement will result in the wire 14 being located midway between the side edges of ground electrode 30.

Figure 5:
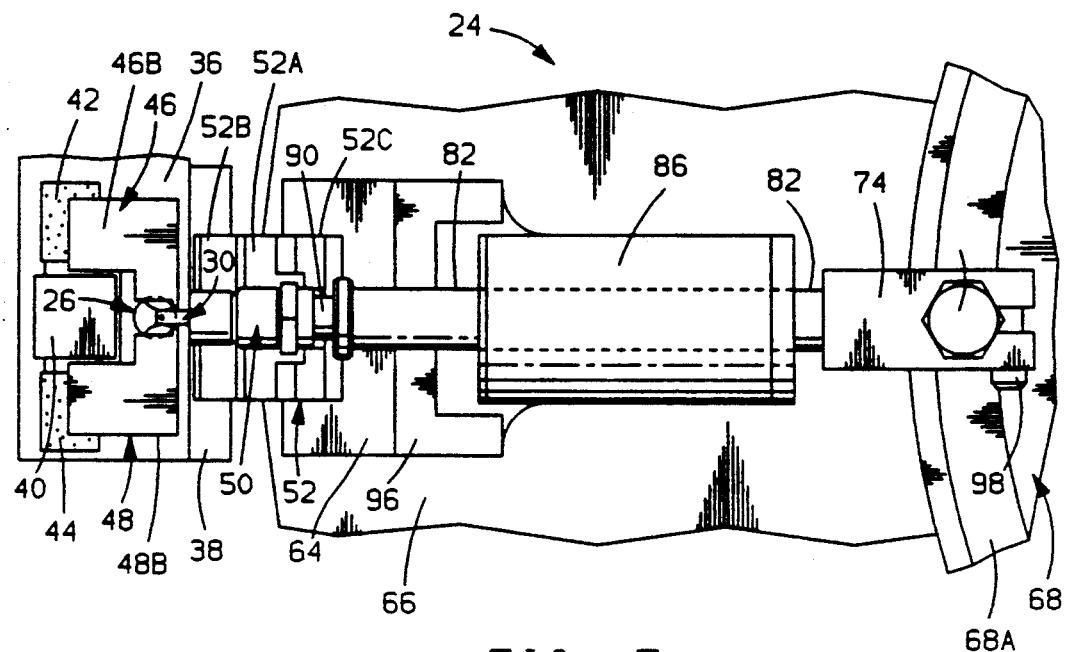
FIGS. 5 and 6 illustrate welding tooling for supporting a spark plug shell with attached ground electrode.

To assure that plunger 90 will push shell 52 to its proper seated position with surfaces 50C and 52F engaged, the connection between cam follower 70 and part 74 is adjustable. To make this adjustment screw 98 (FIG. 5) is loosened. Bolt 72 is now rotated to cause part 74 to be moved to the left or right relative to cam follower 70. Screw 98 is then tightened to lock bolt 72 from movement.

It has been previously mentioned that welding electrode 26 has spherical radius or curved surfaces 26A and 26C so that the end of electrode 26 has a spherical shape. The reason for providing these curved surfaces is to minimize the variation of surface contact area between the spherical end of electrode 26 and the lower surface of ground electrode 30. Further, surface contact area remains substantially constant even if the ground electrode is bent or twisted since it can contact a curved surface. It is important to keep the surface contact area substantially constant so that the contact resistance remains substantially constant. Thus, current is supplied to wire 14 for a predetermined time period and if the contact resistance changed from one ground electrode to another ground electrode, the amount of heat generated at the weld zone would vary, which is undesirable.

Figure 9:
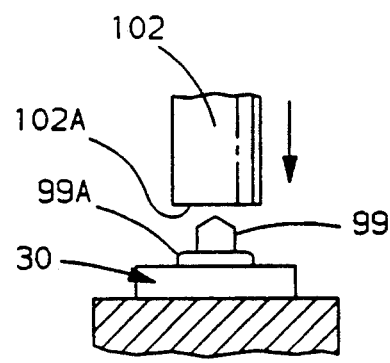
FIG. 9 illustrates coining apparatus utilized in this invention.

FIG. 9 illustrates a coining operation that is formed on a short length of wire that remains after the end of wire 14 has been welded to ground electrode 30 and cut-off. This short length of wire is designated as 99. When the wire is welded to ground electrode 30, a puddle of melted material 99A is formed. Further, the weld or fusion zone or line between portion 99A and ground electrode 30 is slightly below the top surface of ground electrode 30 so that in effect some of the platinum wire 14 is embedded in the material of ground electrode 30. In this regard, material of wire 14 and the ground electrode 30 are melted during the welding operation. Assuming that the wire 14 had a diameter of 0.5 mm, the diameter of puddle 99A may be about 1.0 mm and the weld zone under puddle 99A may be about 1.0 mm diameter.

In the coining operation shown in FIG. 9, the ground electrode 30 is placed on a support 100 and a coining tool 102 is then impacted against the end of wire portion 99. The coining tool 102 has a flat end surface 102A. When the tool 102 impacts the end of wire 99, the wire 99 is forced down into contact with weld puddle 99A. The material of wire portion 99 expands laterally during coining so that after coining, a pad of material is provided that is generally cylindrical and which has a diameter of about 1.0 mm. This pad may have a length of about 0.25 mm and it has a flat end due to coining with flat surface 102A. The width of ground electrode 30 may be about 2.5 mm.

In the practice of the method and apparatus of this invention, the ground electrode 30 can be formed of a nickel-based alloy, for example, INCONEL 600. The ground electrodes are fully annealed and thoroughly cleaned to remove contaminants prior to welding.

The material of wire 14 can be an alloy of platinum, palladium and ruthenium where the amount of platinum is about 84%. However, this invention is not limited to the use of the alloy just described and the material of the wire could be pure platinum or a zirconia grain stabilized (ZGS) platinum.

In the practice of this invention, the force of spring 18, which determines the downward force applied to wire 14 against ground electrode 30, the amount of welding energy applied to wire 14 and the contact resistance between ground electrode 30 and the spherical end of electrode 26 are all arranged and controlled to permit a platinum wire of about 0.5 mm to be successfully welded to the ground electrode with a platinum pad having a welded diameter as large as about 1.0 mm.

At the expense of some reiteration, the following is a summary of some of the features of this invention.

1. The spherical shape of the end of welding electrode 26 coupled with the use of gripping fingers 46 and 48 helps to control the surface contact area between the welding electrode 26 and ground electrode 30 and, hence, the welding resistance during welding and thus reduces the variation of welding energy from weld-to-weld.

2. The spherical surface on the end of welding electrode 26 allows for twisted or bent ground electrodes to be welded without changing the surface contact area between the engaged welding electrode and ground electrode. Hence, it controls the variation of constant resistance and welding energy from part-to-part.

3. The use of the pivotal nests coupled with the gripping fingers allows the platinum wire to be welded at the center (mid-width) of an uncentered, twisted or bent ground electrode.

The term "platinum" as used herein means a wire or material that is pure platinum or a wire that is an alloy of platinum and other materials such as an alloy that includes platinum, palladium and ruthenium.

The embodiments of the invention in which an exclusive property or privilege is claimed are defined as follows:

1. A method of forming a contact pad of platinum that is welded to a metallic electrode of a spark plug, the steps comprising, placing said spark plug electrode in contact with a welding electrode, applying a force to said spark plug electrode to force said spark plug electrode into tight contact with said welding electrode, moving the end of a platinum wire into engagement with said spark plug electrode while forcing said end of said wire against said spark plug electrode, causing electrical current to flow through a portion of said wire adjacent said spark plug electrode, through said spark plug electrode and through said welding electrode to thereby cause an end portion of said wire to be welded to said spark plug electrode and then severing said wire at a point closely adjacent said spark plug electrode.

2. The method according to claim 1 where said platinum wire has a diameter of about 0.5 mm and where the welded diameter of the portion of the wire that is welded to said spark plug electrode is about 1.0 mm.

3. Apparatus for welding a platinum wire to a spark plug electrode comprising, support means adapted to support said spark plug electrode in a predetermined position, a welding electrode having an end surface that is adapted to be moved into engagement with a surface of said spark plug electrode, at least one gripping finger, means supporting said gripping finger for movement toward or away from said spark plug electrode, said gripping finger being positioned relative to said welding electrode such that a surface of said gripping finger engages said spark plug electrode to cause said spark plug electrode to be forced into tight engagement with said end surface of said welding electrode when said gripping finger is moved toward said spark plug electrode, means for causing an end portion of said platinum wire to engage a surface of said spark plug electrode, and means for causing a welding current to pass through a portion of said wire and through said spark plug electrode and said welding electrode to thereby cause said end portion of said wire to be welded to said surface of said spark plug electrode.

4. Apparatus for welding a platinum wire to a spark plug electrode comprising, support means adapted to support said spark plug electrode in a predetermined position, a welding electrode having a spherical end surface that is adapted to be moved into engagement with a surface of said spark plug electrode, at least one gripping finger, means supporting said gripping finger for movement toward or away from said spark plug electrode, said gripping finger being positioned relative to said welding electrode such that a surface of said gripping finger engages said spark plug electrode to cause said spark plug electrode to be forced into tight engagement with said spherical end surface of said welding electrode when said gripping finger is moved toward said spark plug electrode, means for causing an end portion of said platinum wire to engage a surface of said spark plug electrode, and means for causing a welding current to pass through a portion of said wire and through spark plug electrode and said welding electrode to thereby cause said end portion of said wire to be welded to said surface of said spark plug electrode.

5. Apparatus for welding a platinum wire to a spark plug electrode comprising, support means adapted to support said spark plug electrode in a predetermined position, a welding electrode having an end surface that is adapted to be moved into engagement with one surface of said spark plug electrode, a pair of reciprocable gripping fingers, means supporting said gripping fingers for movement toward or away from each other, each of said gripping fingers having an inclined surface, said gripping fingers being positioned relative to said spark electrode such that said inclined surfaces of said gripping fingers respectively engage opposite sides of said spark plug electrode and cause said one surface of said spark plug electrode to be forced into tight engagement with said end surface of said welding electrode when said gripping fingers are moved toward each other, the engagement of said inclined surfaces with said spark plug electrode clamping said spark plug electrode between said gripping fingers in a proper welding position, means for causing an end portion of said platinum wire to engage a surface of said spark plug electrode that is opposite said one surface of said spark plug electrode, and means for causing a welding current to pass through a portion of said wire and through said spark plug electrode and said welding electrode to thereby cause said end portion of said wire to be welded to the surface of said spark plug electrode that is engaged by said wire.

6. The apparatus according to claim 5 where said end surface of said welding electrode has a spherical shape.

7. Apparatus for welding a platinum wire to a ground electrode of a spark plug where the ground electrode is attached to and extends axially from a spark plug shell comprising, a shell supporting nest adapted to receive and support said spark plug shell in a predetermined position, a welding electrode having an end surface that is adapted to be moved into engagement with a first surface of said ground electrode, a pair of reciprocable gripping fingers, means supporting said gripping fingers for movement toward or away from each other, each of said gripping fingers having an inclined surface, said gripping fingers being positioned relative to said welding electrode such that said inclined surfaces of said gripping fingers respectively engage opposite sides of said ground electrode and cause said first surface of said ground electrode to be forced into tight engagement with said end surface of said welding electrode when said gripping fingers are moved toward each other, the engagement of said inclined surfaces with said ground electrode clamping said ground electrode between said gripping fingers in a proper welding position, means for causing an end portion of said platinum wire to engage a second surface of said ground electrode that is opposite said first surface of said ground electrode, and means for causing a welding current to pass through a portion of said wire and through said ground electrode and said welding electrode to thereby cause said end portion of said wire to be welded to said second surface of said ground electrode.

8. The apparatus according to claim 7 where said shell supporting nest is pivotally supported about a pivot axis to thereby allow said ground electrode to be moved by said gripping fingers to a proper welding position when said gripping fingers are moved toward each other.

9. The apparatus according to claim 7 where said end surface of said welding electrode has a spherical shape.

10. The apparatus according to claim 7 which includes a reciprocable plunger, said plunger at times being moved into said spark plug shell, said plunger when moved into said spark shell causing an outer surface of said shell to engage a surface of said nest.

11. A method of forming a contact pad of platinum that is welded to a metallic electrode of a spark plug, the steps comprising, placing said spark plug electrode in contact with a welding electrode, applying a force to said spark plug electrode to force said spark plug electrode into tight contact with said welding electrode, the part of said welding electrode that engages said spark plug electrode having a spherical shape, moving the end of a platinum wire into engagement with said spark plug electrode while forcing said end of said wire against said spark plug electrode, causing electrical current to flow through a portion of said wire adjacent said spark plug electrode, through said spark plug electrode and through said welding electrode to thereby cause an end portion of said wire to be welded to said spark plug electrode and then severing said wire at a point closely adjacent said spark plug electrode.

* * * * *